United States Patent
Harano

(10) Patent No.: US 9,586,280 B2
(45) Date of Patent: Mar. 7, 2017

(54) METHOD FOR MANUFACTURING OPTICAL MODULE

(71) Applicant: FUJIKURA LTD., Tokyo (JP)

(72) Inventor: Yasushi Harano, Sakura (JP)

(73) Assignee: FUJIKURA LTD., Tokyo (JP)

( * ) Notice: Subject to any disclaimer, the term of this patent is extended or adjusted under 35 U.S.C. 154(b) by 363 days.

(21) Appl. No.: 14/254,185

(22) Filed: Apr. 16, 2014

(65) Prior Publication Data

US 2014/0224787 A1    Aug. 14, 2014

Related U.S. Application Data

(63) Continuation of application No. PCT/JP2012/070961, filed on Aug. 20, 2012.

(30) Foreign Application Priority Data

Oct. 18, 2011    (JP) .................. 2011-229197

(51) Int. Cl.
*B23K 1/00* (2006.01)
*G02B 6/42* (2006.01)
*B23K 1/002* (2006.01)

(52) U.S. Cl.
CPC ............ *B23K 1/0008* (2013.01); *B23K 1/002* (2013.01); *G02B 6/4202* (2013.01); *G02B 6/4248* (2013.01)

(58) Field of Classification Search
CPC .... B23K 1/0008; B23K 1/002; G02B 6/4202; G02B 6/4248

(Continued)

(56) References Cited

U.S. PATENT DOCUMENTS 5,692,086 A    11/1997  Beranek et al.
5,748,822 A     5/1998  Miura et al.
(Continued)

FOREIGN PATENT DOCUMENTS

CN          1221120 A    6/1999
CN        102207591 A   10/2011
(Continued)

OTHER PUBLICATIONS

International Search Report for PCT/JP2012/070961, Mailing Date of Sep. 25, 2012.
(Continued)

*Primary Examiner* — Thien S Tran
(74) *Attorney, Agent, or Firm* — Westerman, Hattori, Daniels & Adrian, LLP

(57) ABSTRACT

A method for manufacturing an optical module 1 includes: a cladding 12 of one end of the optical fiber is exposed; an arrangement process of arranging the optical fiber 10 such that at least a leading end of a portion on which the cladding 12 is exposed is positioned in a box portion through a pipe portion 35 in which one end is connected to the box portion 31 configured to accommodate an optical element and which extends to an outside of the box portion 31; and a soldering process of soldering an inner wall of the pipe portion 35 and the optical fiber 10 by heating at least a part of a lower region BAR interposed between a heat dissipation portion and the pipe portion 35 in a state where a part of a wall of the box portion 31, in which the optical element is accommodated, is heat-dissipated.

7 Claims, 9 Drawing Sheets

(58) Field of Classification Search
USPC ......... 219/121.63, 121.64, 616, 617; 385/13, 385/80, 91, 92, 94, 137
See application file for complete search history.

(56) References Cited

U.S. PATENT DOCUMENTS

| | | |
|---|---|---|
| 2011/0158594 A1 | 6/2011 | Yalamanchili et al. |
| 2011/0242835 A1 | 10/2011 | Masuko |
| 2011/0299817 A1* | 12/2011 | Sakamoto ............ G02B 6/4248 385/94 |

FOREIGN PATENT DOCUMENTS

| | | | |
|---|---|---|---|
| DE | 3801938 A1 | | 8/1989 |
| GB | 2330101 A | | 4/1999 |
| JP | 02-012114 A | | 1/1990 |
| JP | 07-287130 A | | 10/1995 |
| JP | 09-96747 A | | 4/1997 |
| JP | 09-166727 A | | 6/1997 |
| JP | H09161962 | * | 6/1997 |
| JP | 2002-350689 A | | 12/2002 |
| JP | 2005-301180 A | | 10/2005 |

OTHER PUBLICATIONS

Chinese Office Action dated Jan. 26, 2015, issued in corresponding CN Patent Application No. 201280047309.5 (6 pages).
Extended European Search Report dated Feb. 11, 2015, issued in corresponding EP Patent Application No. 12840921.6 (4 pages).

* cited by examiner

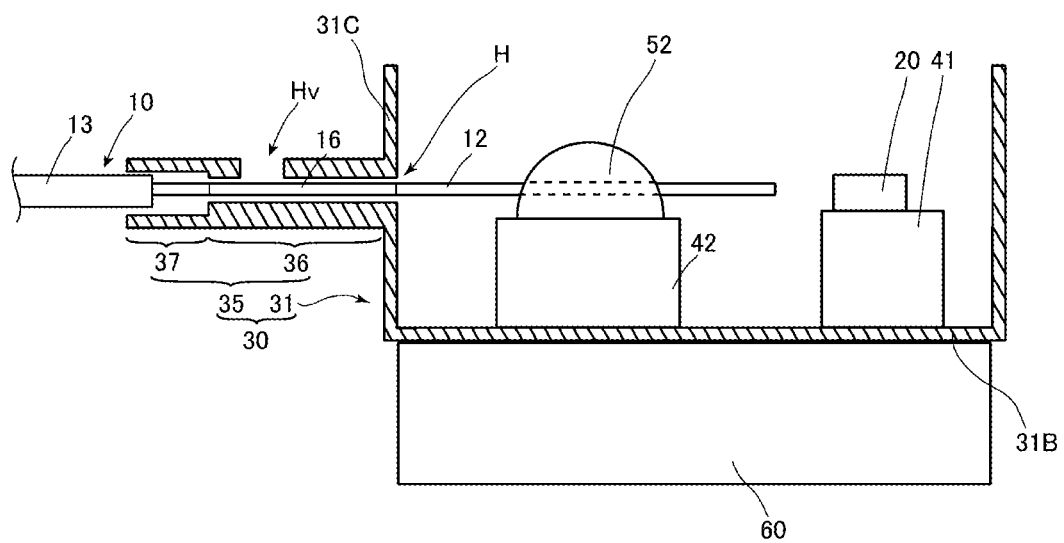

METHOD FOR MANUFACTURING OPTICAL MODULE

TECHNICAL FIELD

The present invention relates to a method for manufacturing an optical module which can manufacture optical modules with high reliability.

BACKGROUND ART

An optical module is well known in which a laser beam emitted from a semiconductor laser element is incident on a core of an optical fiber. In the optical module, generally, a laser sub-mount and a fiber sub-mount are arranged on a base pedestal in a housing. Then, the semiconductor laser element is fixed onto the laser sub-mount in a state relative positions of ends of the semiconductor laser element and the optical fiber are correctly fitted to each other, and one end side of the optical fiber is fixed onto the fiber sub-mount.

The other end side of the optical fiber passes through a pipe which projects to an outer peripheral side of the housing and is guided outside the housing, and thus a space between an inner peripheral surface of the pipe and an outer peripheral surface of the optical fiber is sealed without a gap. Further, the pipe is sometimes referred to as a sleeve.

As a method for sealing the inner peripheral surface of the pipe and the outer peripheral surface of the optical fiber, as in the following Patent Document 1, there is a method in which a solder is melted by resistance heating, induction heating, laser heating or the like to be filled in the pipe and then the filled solder is solidified.

CITATION LIST

Patent Document

[Patent Document 1] JP-A-2002-350689

SUMMARY OF INVENTION

Objects to be Achieved by the Invention

However, in order to suppress a temperature rise or the like in the housing caused due to the heating or the like of the solder, there is a case of cooling a part of the housing in a process of manufacturing the optical module. In this case, a temperature gradient easily occurs in the pipe in the housing.

When the temperature gradient occurs, wettability of the solder deteriorates in a place in which a temperature is relatively low in the pipe. As a result, positional accuracy of the optical fiber on the fiber sub-mount decreases or the sealing of the pipe and the optical fiber is insufficient, and thus the reliability of the optical module is reduced.

Therefore, an object of the present invention is to provide a method for manufacturing an optical module which can manufacture optical modules with high reliability.

Means for Achieving the Objects

In order to achieve the above object, according to the present invention, there is provided a method for manufacturing an optical module, including: a preparation process of preparing an optical fiber, a cladding of one end of the optical fiber is exposed; an arrangement process of arranging the optical fiber such that at least a leading end of a part on which the cladding is exposed is positioned in a box portion through a pipe portion in which one end is connected to the box portion configured to accommodate an optical element and which extends to an outside of the box portion; and a soldering process of soldering an inner wall of the pipe portion and the optical fiber by heating at least a part of a wall region of the box portion interposed between a heat dissipation portion and the pipe portion in a state in which a part of the box portion, in which the optical element is accommodated, is heat-dissipated.

According to the method for manufacturing an optical module, since the soldering is performed in the state in which a part of the box portion is heat-dissipated, the temperature rise of the optical element caused due to the heating, which occurs in the soldering, is significantly reduced, and the deterioration of the characteristics of the optical element is previously prevented. In addition, since the wall region interposed between the heat dissipation portion and the pipe portion is subjected to the heating, it is possible to suppress the heat to conduct from the pipe portion to the heat dissipation portion through the wall other than the heat dissipation portion of the box portion as compared with the case in which the pipe portion itself is subjected to the heating. Therefore, as compared with the case in which the pipe portion itself is subjected to the heating, the difference in the peak temperature of the leading end portion in the pipe portion and the portion connected to the box portion becomes smaller and the difference in the time until the connection portion and the leading end portion reach the melting point of the solder is significantly reduced. As a result, even when a part of the housing is heat-dissipated, it is possible to make the wettability of the solder excellent and to spread the solder in a short time from the leading end of the pipe portion to the connection portion with the box portion. Thus, the worsening of the wettability of the solder due to the temperature gradient and the optical module with high reliability can be manufactured.

Further, it is preferable that in the soldering process, heating is performed over a pair of ends provided in a widthwise direction of a wall, to which the pipe portion is connected, in the wall region. Alternatively, it is preferable that in the soldering process, heating is performed along a boundary between a wall, to which the pipe portion is connected, and the pipe in the wall region.

According to the method for manufacturing an optical module, as compared with the case in which a part of the wall region is heated, it is possible to avoid the heat to conduct in advance from the pipe portion to the heat dissipation portion, going around the heating portion in the wall region. Accordingly, even when a part of the housing is heat-dissipated, it is possible to still more suppress the temperature gradient in the inner space of the pipe portion up to the vicinity of the boundary between the pipe portion and the box portion.

Further, it is preferable that in the soldering process, induction heating is performed by magnetic field lines generated in a magnetic core on which a coil is wound.

According to the method for manufacturing an optical module, as compared with the heating by the laser and the heating by the soldering iron, both of the inner side and the outer side of the wall region are subjected to the heating, and even when a part of the housing is heat-dissipated, it is possible to still more suppress the temperature gradient in the inner space of the pipe portion up to the vicinity of the boundary between the pipe portion and the box portion.

Further, it is preferable that the wall to which the pipe portion is connected has higher magnetic permeability than the pipe portion.

According to the method for manufacturing an optical module, since the induction heating amount per unit space of the wall increases compared with the pipe portion, even when a part of the housing is heat-dissipated, it is possible to still more suppress the temperature gradient in the inner space of the pipe portion up to the vicinity of the boundary between the pipe portion and the box portion.

Effect of Invention

As described above, according to the present invention, it is possible to improve the wettability of the solder in the inner space of the pipe portion up to the vicinity of the boundary between the pipe portion and the box portion without deteriorating characteristics of the optical element, thereby manufacturing the optical module with high reliability.

BRIEF DESCRIPTION OF DRAWINGS

FIG. 5 is a diagram illustrating a state of the optical module in the middle of the manufacturing process.

DESCRIPTION OF EMBODIMENTS

Hereinafter, a preferred embodiment of a method for manufacturing an optical module according to the present invention will be described in detail with reference to the drawings.

Figure 1:
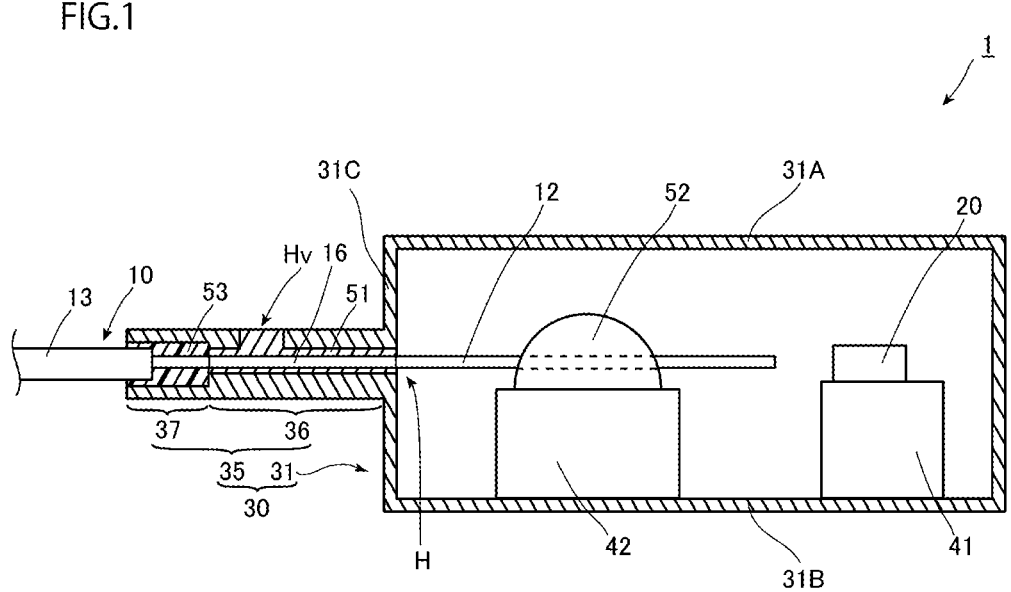
FIG. 1 is a schematic diagram of an optical module according to the present invention when viewed from a side.

FIG. 1 is a schematic diagram of the optical module according to the embodiment of the present invention when viewed from the side. As illustrated in FIG. 1, an optical module 1 includes a housing 30, a laser sub-mount 41, a fiber sub-mount 42, a semiconductor laser element 20, and an optical fiber 10 as main components. In order to facilitate the understand, further, only the housing 30 is illustrated in a cross-sectional shape, and the laser sub-mount 41, the fiber sub-mount 42, and the semiconductor laser element 20 are simplified in a cuboidal shape.

The housing 30 is made up of a box portion 31 and a pipe portion 35, and these components are integrally formed. The box portion 31 includes a top wall 31A, a bottom wall 31B, and a side wall 31C, which is sandwiched between the top wall 31A and the bottom wall 31B, and defines a closed space by these walls. In this embodiment, the box portion 31 is defined substantially in a cuboidal hollow. A penetration hole H is formed at the side wall 31C of the box portion 31.

The pipe portion 35 is a pipe extending straightly to the outside of the box portion 31, and a space inside the box portion is communicated with a space outside the box portion through the penetration hole H. In the pipe portion 35, a thickness of a part close to the box portion 31 based on an intermediate position thereof is different to that of a part distant from the box portion 31 based on the intermediate position as a boundary. The close part is formed as a thick portion 36 and the distant part is formed as a thin portion 37. In the pipe portion 35, accordingly, a vertical cross-sectional area of the thick portion 36 close to the box portion 31 based on the intermediate position is smaller than a vertical cross-sectional area of the thin portion 37 distant from the intermediate position of the pipe portion.

In the thick portion 36, an opening Hv is perpendicularly formed with respect to a longitudinal direction of the pipe portion 35 to penetrate from an outer peripheral surface to an inner peripheral surface of the pipe portion 35.

Furthermore, the housing 30 may be configured in such a manner that the box portion 31 and the pipe portion 35 are molded as a separate body and then one end of the pipe portion 35 is connected to the side wall 31C of the box portion 31. In addition, the box portion 31 and the pipe portion 35 may be molded using different materials, respectively.

The laser sub-mount 41 is a pedestal for adjusting a height the semiconductor laser element 20 and is fixed to a predetermined position on an inner wall of the box portion 31 by, for example, soldering or the like. A material constituting the laser sub-mount 41 is not particularly limited, but may include, for example, a ceramic such as AlN or Al2O3. In these materials, AlN is preferred from the viewpoint of excellent thermal conductivity. Furthermore, the laser sub-mount 41 may be integrally molded with the box portion 31.

The fiber sub-mount 42 is a pedestal for adjusting a height of the optical fiber 10 and is fixed to a predetermined position on the inner wall of the box portion 31 by, for example, the soldering or the like. A material constituting the fiber sub-mount 42 is not particularly limited, but may include, for example, the same material as the material constituting the laser sub-mount 41. In these materials, AlN is preferred from the viewpoint of excellent thermal conductivity. Furthermore, the fiber sub-mount 42 may be integrally molded with the box portion 31.

Figure 2:
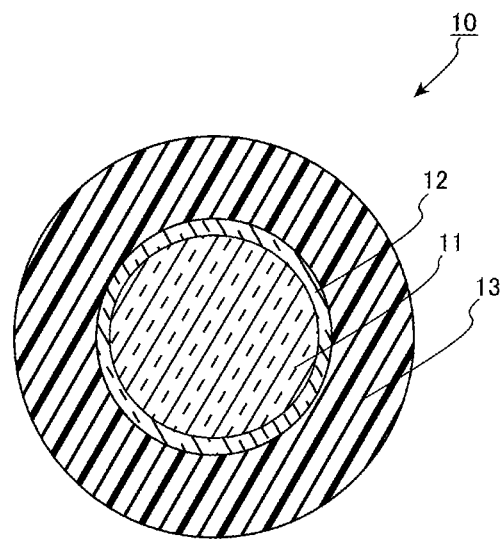
FIG. 2 is a diagram illustrating a cross section which is perpendicular to a longitudinal direction of the optical fiber.

FIG. 2 is a diagram illustrating a cross-sectional configuration which is perpendicular to a longitudinal direction of the optical fiber 10. As illustrated in FIG. 2, the optical fiber 10 is made up of a core 11, a cladding 12 which surrounds the outer peripheral surface of the core 11, and a coating layer 13 which coats the outer peripheral surface of the cladding 12. The core 11 is formed of, for example, quartz to which a dopant such as germanium is added to increase a refractive index. The cladding 12 is formed of, for example, pure quartz to which no dopant is added. The refractive index of the cladding is lower than that of the core 11. The coating layer 13 is, for example, one layer or at least two layers of a resin layer which is formed of an ultraviolet curable resin or the like.

Figure 3:
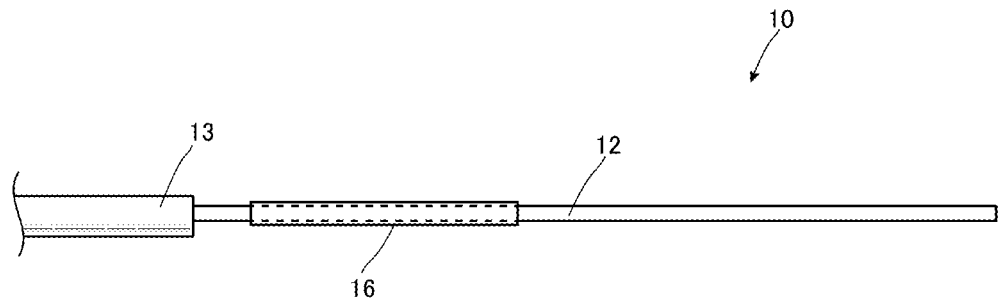
FIG. 3 is a diagram illustrating a state of one end side of the optical fiber.

FIG. 3 is a diagram illustrating a state of one end side of the optical fiber 10. As illustrated in FIG. 3, the optical fiber 10 is configured such that the coating layer 13 on one end side is peeled off and thus the cladding 12 is exposed. The outer peripheral surface of a part, on which the cladding 12 is exposed, is covered by a metalized layer 16 from a leading end at predetermined intervals.

The metalized layer 16 is a layer of each metal to which solder is fixable. As will be described below, since soldering is performed without flux, it is preferable that the surface of the metalized layer 16 be made of Au in order to increase solder-wettability. In order to increase adhesion between the cladding of the optical fiber 10 and Au, it is more preferable that a Ni layer be provided as an underlayer. In the present embodiment, the metalized layer 16 is formed in a laminated body including the Ni layer and the Au layer, the Ni layer covers the outer peripheral surface of the cladding 12, and the Au layer covers the outer peripheral surface of the Ni layer. In addition, the thicknesses of the Ni layer and the Au layer are not particularly limited, but, for example, the thickness of the Ni layer is in a range of 2 m to 3 m, and the thickness of the Au layer is in a range of 0.1 m to 0.2 m. The Ni layer absorbs some of leakage light.

As illustrated in FIG. 1, the metalized layer 16 is located in an inner space of the thick portion 36 and is fixed to the thick portion 36 by solder 51.

The solder 51 is filled in the whole inner space of the thick portion 36 in the pipe portion 35 and is also filled in the whole opening Hv to seal with no gap, and as a result, the box portion 31 is air-tightly sealed. A material of the solder 51 may include, for example, a gold-tin based eutectic solder, and a ratio between Au and tin (Sn) may include Au 80%-Sn 20% or Au 10%-Sn 90%. In the present embodiment, the solder 51 of Au 80%-Sn 20% will be described. In this case, a melting point of the solder is about 280 degrees.

In addition, as illustrated in FIG. 1, an end of the coating layer 13 of a side, to which the cladding 12 is exposed in the optical fiber 10, is located in the inner space of the thin portion 37 in the pipe portion 35, and the end is fixed to the thin portion 37 by a fixing resin 53.

The fixing resin 53 is filled in the whole inner space of the thin portion 37 to cover the outer peripheral surface including a boundary between a part in which the cladding 12 of the optical fiber 10 is covered by the coating layer 13 and a part in which the cladding is exposed from the coating layer 13, and thus the boundary part is protected. A material of the fixing resin 53 is not particularly limited, but may include, for example, an ultraviolet curable resin.

Further, the end of the side, to which the cladding 12 is exposed in the optical fiber 10, is directed to an emitting surface of the semiconductor laser element 20, and the optical fiber 10 and the semiconductor laser element 20 are optically coupled to each other such that laser beam emitted from the semiconductor laser element 20 is incident on the core 11 of the optical fiber 10.

In the above optical module 1, the semiconductor laser element 20 is pumped by power supplied from a power source (not illustrated), and the laser beam is emitted. The laser beam is incident on the core 11 of the optical fiber 10 and is then emitted to the outside of the optical module 1 by transmitting through the core 11.

Furthermore, when the laser beam is incident on the optical fiber 10, a part of the laser beam is incident on the cladding 12 as leakage light in some cases due to refraction at an end face of the optical fiber 10 and a deviation of an optical axis between the optical fiber 10 and the semiconductor laser element 20. In this case, the leakage light is mainly transmitted through the cladding 12 and reaches a part in which the optical fiber 10 is coated with the metalized layer 16. Thus, at least a part of the leakage light is absorbed by the metalized layer 16 and is converted to heat. At this time, the heat generated in the metalized layer is transmitted to the pipe portion 35 of the housing 30 through the solder 51 and is released to the outside.

Next, with respect to the method for manufacturing the optical module 1, a first to third manufacturing methods will be described, respectively.

(First Manufacturing Method)

Figure 4:
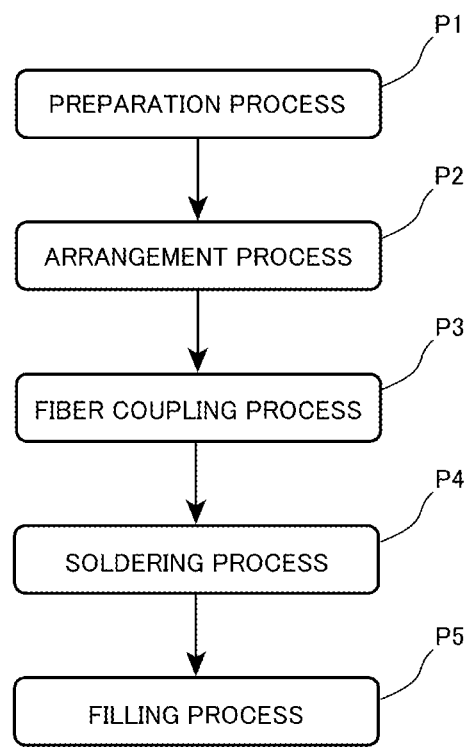
FIG. 4 is a flowchart illustrating processes of a method for manufacturing an optical module.

FIG. 4 is a flowchart illustrating processes of a first manufacturing method. As illustrated in FIG. 4, the method for manufacturing the optical module 1 mainly includes a preparation process P1, an arrangement process P2, a fiber coupling process P3, a soldering process P4, and a filling process P5.

Figure 6A:
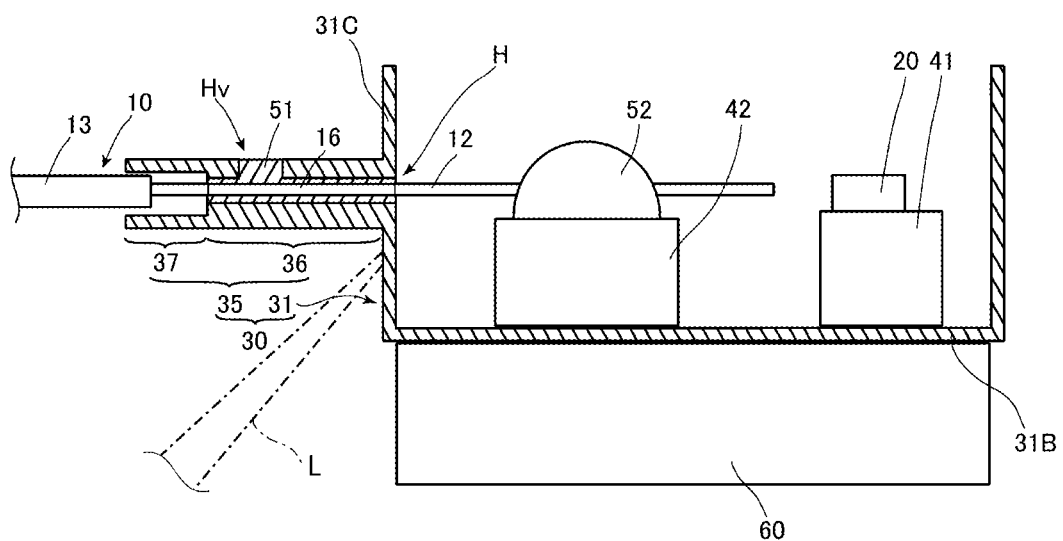
FIGS. 6A and 6B are diagrams illustrating a state of soldering of a pipe portion by laser heating when viewed from the side and the longitudinal direction of the optical fiber.
Figure 6B:
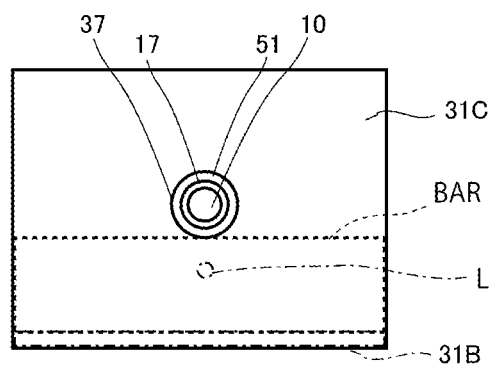

Hereinafter, these processes P1 to P5 will be described in detail using appropriately FIG. 5 and FIGS. 6A and 6B. FIG. 5 is a diagram illustrating a state of the optical module in the middle of the manufacturing process. FIGS. 6A and 6B are a diagram illustrating the soldering state of the pipe portion by laser heating. Furthermore, FIG. 6A illustrates a state when viewed from the side, and FIG. 6B illustrates a state when viewed from the longitudinal direction of the optical fiber 10.

<Preparation Process P1>

In this preparation process P1, as illustrated in FIG. 5, the optical fiber 10 provided with the metalized layer 16 on a part of the outer peripheral surface of the cladding 12 is prepared. That is, the coating layer 13 is peeled off at one end side of the optical fiber 10 and the cladding 12 is exposed. Then, the metalized layer 16 is provided in a region, in which the soldering is scheduled, of the outer peripheral surface of the cladding 12.

Further, the region in which the soldering is scheduled, specifically, is the cladding outer peripheral surface of the optical fiber 10 located at the thick portion 36 when the end of the optical fiber 10 is inserted into the pipe portion 35 and is accommodated in the box portion 31 through the penetration hole H.

As described above, since the metalized layer 16 is the laminated body of, for example, the Ni layer and the Au layer, it is preferable that the metalized layer be provided by a plating method. Using the plating method, the metalized layer 16 can be provided on the outer peripheral surface of the cladding 12, in which an outer shape is a columnar side-shape, with a more uniform thickness.

Thus, the optical fiber 10, in which the metalized layer 16 is provided on a part of the outer peripheral surface of the cladding 12, is prepared.

Further, in the preparation process P1, as illustrated in FIG. 5, the housing 30 is prepared onto which the optical fiber 10 provided with the metalized layer 16 is mounted. That is, first, the housing 30 is prepared in which the inner space of the box portion 31 is exposed. Specifically, in the present process, the housing 30 is prepared in which the top wall 31A of the box portion 31 is not provided.

Subsequently, the laser sub-mount 41, the fiber sub-mount 42, and the semiconductor laser element 20 are arranged at predetermined positions of the box portion 31, respectively and are fixed by, for example, the soldering or the like.

Thus, the housing 30 is prepared onto which the optical fiber 10 provided with metalized layer 16 is mounted.

<Arrangement Process P2>

In this arrangement process P2, as illustrated in FIG. 5, the housing 30 prepared in the preparation process P1 is arranged on a heat sink 60 in a state in which the bottom wall 31B of the box portion 31, to which the laser sub-mount 41 and the fiber sub-mount 42 are fixed, faces the heat sink 60.

Further, in the arrangement process P2, the optical fiber 10 prepared in the preparation process P1 is arranged in the housing 30 prepared in the preparation process P1. Specifically, the optical fiber 10 is inserted into the pipe portion 35 from a peeling side of the coating layer 13 and is inserted until the metalized layer 16 is located at the thick portion 36.

Furthermore, in this arrangement process P2, an arrangement position of the optical fiber 10 is finely adjusted such that a central axis of the optical fiber 10 is fitted to the optical axis of the laser beam emitted from the semiconductor laser element 20 using a tool (not illustrated). As a result, the semiconductor laser element 20 and the optical fiber 10 are optically coupled to each other.

<Fiber Coupling Process P3>

In this fiber coupling process P3, a part of the optical fiber 10 on the fiber sub-mount 42 is coupled and fixed to the fiber sub-mount 42 using, for example, a coupling member 52 such as a resin.

<Soldering Process P4>

In this soldering process P4, a part of the optical fiber 10 including the metalized layer 16 is soldered in a state in which the bottom wall 31B of the box portion 31 is heat-dissipated by the heat sink 60. That is, first, the solder 51 is arranged in the opening Hv of the pipe portion 35. Further, the arrangement of the solder 51 may be performed in the above-described arrangement process P2. In addition, as a composition of the solder 51, it is preferable that a flux be not contained in view of avoiding an adhesion of the flux with respect to the end face of the optical fiber 10 and the emitting surface of the semiconductor laser element 20 or preventing corrosion (oxidation ore sulfurization) of the solder.

Further, in order to suppress an influence of heat on the semiconductor laser element 20, a temperature of the bottom wall 31B may be, for example, 150° C. or lower on heating of the solder 51. Therefore, heat may be dissipated such that a temperature of the housing 30 is lower than 150° C.

Subsequently, as illustrated in FIGS. 6A and 6B, an outer wall of a lower region BAR in the side wall 31C of the box portion 31 is irradiated with a laser beam L radiated from a laser apparatus (not illustrated) as a heating unit. Specifically, the lower region BAR is a region which is interposed between the pipe portion 35 and the bottom wall 31B of the box portion 31 in the side wall 31C of the box portion 31.

Thus, when an inner wall of the lower region BAR is irradiated with the laser beam L, heat due to the heating at the irradiation position is conducted to the solder 51 through the thick portion 36 of the pipe portion 35, and thus the solder 51 is melted. As a result, the solder 51 spreads to the thick portion 36.

Subsequently, when a predetermined irradiation period has elapsed since the irradiation of the laser beam L began, the radiation of the laser beam L is stopped. Consequently, the solder 51 immediately solidified, and as illustrated in FIG. 1, the optical fiber 10 is fixed to the thick portion 36 in the pipe portion 35 and the inner space of the thick portion 36 is sealed without a gap.

Figure 7A:
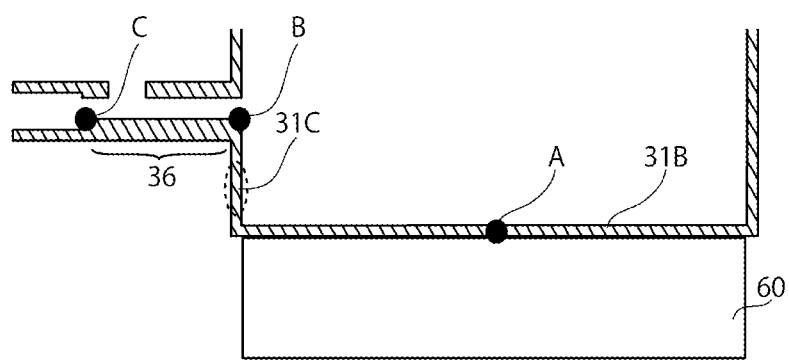
FIGS. 7A to 7C are diagrams for describing a temperature transition of the pipe portion in a case in which heating regions are different.
Figure 7B:
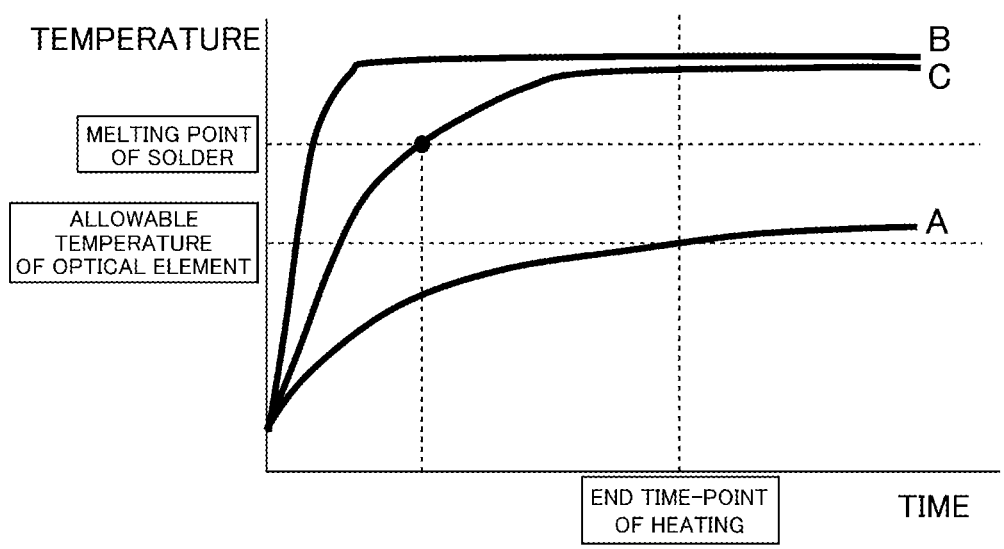
Figure 7C:
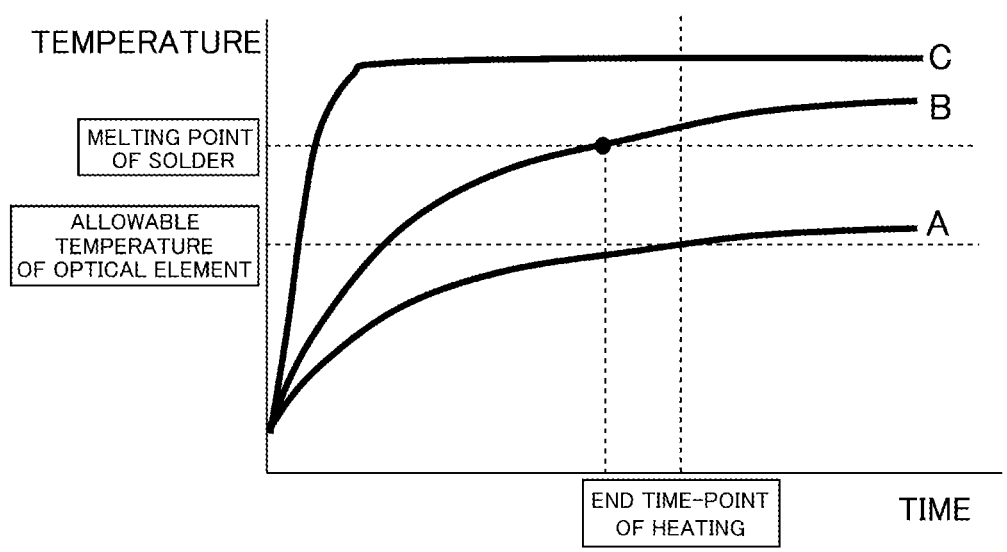

Here, FIGS. 7A to 7C illustrate a temperature transition of the thick portion 36 in the case in which a heating target is the lower region BAR and the case in which the heating target is the thick portion 36 itself of the pipe portion 35. FIG. 7A is a diagram schematically illustrating positions A to C illustrated in graphs of FIGS. 7B and 7C. In addition, FIG. 7B is a graph illustrating the temperature transition of the thick portion 36 in the case in which the heating target is the lower region BAR, and FIG. 7C is a graph illustrating the temperature transition of the thick portion 36 in the case where the heating target is the thick portion 36.

In the case in which the heating target is the thick portion 36 itself, as illustrated in FIGS. 7A and 7C, a timing at which a connection portion (position B) with the box portion 31 in the thick portion 36 reaches the melting point of the solder 51 is significantly slower compared with a leading end portion (position C) of the thick portion 36. For this reason, the solder 51 arranged in the opening Hv of the thick portion 36 starts to flow to the leading end portion (position C) in preference to the connection portion (position B). Accordingly, there is a higher tendency that the solder 51 fails to reach the connection portion (position B) and a certain heating period elapses. In addition, a peak temperature of the connection portion (position B), which is thermally connected to the heat sink 60 through the box portion 31, is considerably below compared with a peak temperature of the leading end portion (position C). Therefore, in the case of providing a long heating period, a temperature gradient between the connection portion (position B) and the leading end portion (position C) increases. Accordingly, even though the solder 51 reaches the connection portion (position B), the wettability is deteriorated.

On the other hand, in the case in which the lower region BAR is subjected to the heating, as illustrated in FIGS. 7A and 7B, a temperature of the connection portion (position B) is higher than that of the leading end portion (position C), and a timing at which the connection portion reaches the melting point of the solder 51 is significantly faster compared with the leading end portion (position C). For this reason, the solder 51 arranged in the opening Hv of the thick portion 36 starts to flow to the connection portion (position B) in preference to the leading end portion (position C). Accordingly, there is a considerably lower tendency that the solder 51 fails to reach the connection portion (position B) and a certain heating period elapses. Meanwhile, as seen from the comparison between FIGS. 7B and 7C, when the lower region BAR is subjected to the heating, a difference in temperature between the connection portion (position B) and the leading end portion (position C) becomes small as compared with the case in which the thick portion 36 itself is subjected to the heating. Therefore, the temperature gradient between the connection portion (position B) and the leading end portion (position C) generated upon heating is significantly reduced as compared with the case in which the thick portion 36 itself is subjected to the heating. In addition, a difference between the time at which the connection portion (position B) reaches the melting point of the solder 51 and the time at which the leading end portion (position C) reaches the melting point of the solder 51 is significantly reduced. Therefore, without providing a long heating period, it is possible to spread the solder 51 from the leading end portion of the thick portion 36 to the connection portion with the box portion 31.

Thus, since the lower region BAR in the side wall 31C of the box portion 31 is subjected to the laser heating in the present process, it is possible to make the wettability of the solder 51 excellent and to spread the solder 51 in a short time from the leading end of the thick portion 36 to the connection portion with the box portion 31.

Further, in the present process, since the bottom wall 31B of the box portion 31 is in a state of heat dissipation by the heat sink 60, a temperature rise of semiconductor laser element 20 itself due to the heating of the lower region BAR of the side wall 31C is significantly reduced. Consequently, the deterioration of characteristics of the semiconductor laser element 20 due to the heating of the lower region BAR in the side wall 31C of the box portion 31 is suppressed.

Further, in the present process, as seen from the comparison between FIGS. 7B and 7C, a period from a time point where both of the connection portion (position B) and the leading end portion (position C) in the thick portion 36 exceeds the melting point of the solder 51 to a time point in which the bottom wall 31B (position A) to be heat-dissipated exceeds an allowable temperature of the semiconductor laser element 20 becomes longer as compared with the case in which the thick portion 36 itself is subjected to the heat. For this reason, a control of the soldering process is also facilitated.

Further, from the viewpoint of preventing worsening of the wettability of the solder 51 caused due to the temperature gradient between the heating and the heat dissipation, it is preferable that an irradiation target of the laser beam L be a vicinity of a position nearest to the bottom wall 31B of the box portion 31 in the boundary portion between the side wall 31C of the box portion 31 and the outer peripheral surface of the pipe portion 35.

<Filling Process P5>

In this filling process P5, the fixing resin 53 is filled in the inner space of the thin portion 37 in the pipe portion 35. For example, when the fixing resin 53 is the ultraviolet curable resin, an uncured ultraviolet curable resin which is a precursor of the ultraviolet curable resin is filled from a side opposite to the box portion 31 side of the penetration hole H, and the uncured ultraviolet curable resin is irradiated with an ultraviolet ray. Thus, the outer peripheral surface including the boundary between the part in which the cladding 12 of the optical fiber 10 is covered by the coating layer 13 and the part in which the cladding is exposed from the coating layer 13 is fixed to the thin portion 37 while being covered with the fixing resin 53.

Finally, the top wall 31A of the box portion 31 in the housing 30 is mounted, and thus the optical module 1 illustrated in FIG. 1 can be obtained.

As described above, according to the first method for manufacturing the optical module 1 in the present embodiment, the heat generated by the laser heating is applied to the solder 51 through the side wall 31C and the inner thick portion 36 of the housing in the state in which the bottom wall 31B of the box portion 31 is heat-dissipated by the heat sink 60. Thus, the temperature rise of the semiconductor laser element 20 it self caused due to the laser heating is significantly reduced.

In addition, the target of the laser heating is the lower region BAR in the side wall 31C of the box portion 31. In this case, both of the connection portion and the leading end portion in the pipe portion 35 will be present on a side opposite to the side with the heat sink 60 using the laser radiation position of a heat source as a boundary. Thus, as compared with the case in which the thick portion 36 itself in the pipe portion 35 is subjected to the laser heating, the difference in the peak temperature of the leading end portion of the thick portion 36 and the connection portion with the box portion 31 becomes smaller and the difference in the time until the connection portion and the leading end portion reach the melting point of the solder 51 is significantly reduced. Accordingly, it is possible to make the wettability of the solder 51 excellent and to spread the solder 51 in a short time from the leading end of the thick portion 36 to the connection portion with the box portion 31. Thus, the worsening of the wettability of the solder 51 caused due to the temperature gradient between the heating and the heat dissipation is previously prevented.

(Second Manufacturing Method)

Figure 8A:
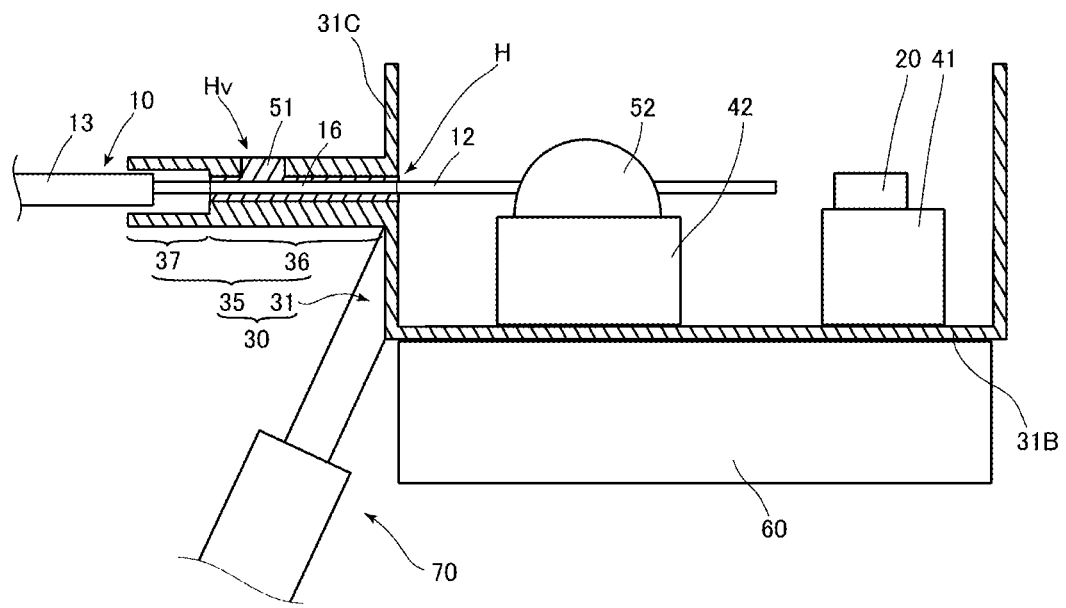
FIGS. 8A and 8B are diagrams illustrating a state of the soldering of the pipe portion by resistance heating when viewed from the side and the longitudinal direction of the optical fiber.
Figure 8B:
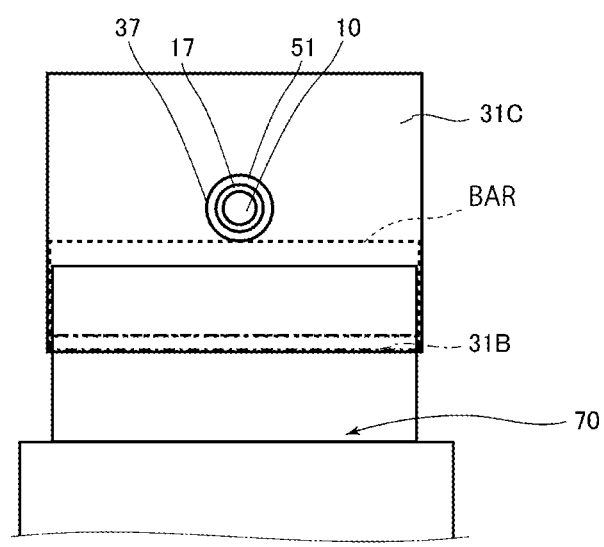

In a second manufacturing method, among the processes P1 to P5 of the above-described first manufacturing method, since only the soldering process P4 is different from that of the first manufacturing method, the soldering process P4 will be described with reference to FIGS. 8A and 8B. FIGS. 8A and 8B are diagrams illustrating a state of a soldering of the pipe portion by a resistance heating when viewed from a side and a longitudinal direction of the optical fiber.

The soldering process P4 in the second manufacturing method which is soldered by the resistance heating is different from the soldering process P4 in the first manufacturing method which is soldered by the laser heating.

As illustrated in FIGS. 8A and 8B, in the soldering process P4 of the second manufacturing method, a soldering iron 70 having an iron head adapted to abut on at least part of the lower region BAR in the side wall 31C is used as a heating unit. Specifically, in the present process, the iron head of the soldering iron 70 is abutted over a pair of ends provided in a widthwise direction of the lower region in the lower region BAR.

Thus, when the iron head is abutted on the lower region BAR, the heat generated by the resistance heating of the iron head is conducted to the solder 51 through the thick portion 36 of the pipe portion 35, and thus the solder 51 is melted. As a result, the solder 51 spreads to the thick portion 36.

As described above, according to the second method for manufacturing the optical module 1 in the present embodiment, the heat generated by the resistance heating of the soldering iron 70 is applied to the solder 51 through the side wall 31C and the inner thick portion 36 of the housing in the state in which the bottom wall 31B of the box portion 31 is heat-dissipated by the heat sink 60. Thus, as in the first manufacturing method, the temperature rise of the semiconductor laser element 20 itself caused due to the resistance heating of the soldering iron 70 is significantly reduced. Consequently, the deterioration of the characteristics of the semiconductor laser element 20 caused due to the resistance heating of the soldering iron 70 is suppressed.

In addition, according to the present manufacturing method, the target of the resistance heating is the lower region BAR in the side wall 31C of the box portion 31. In this case, as in the first manufacturing method, both of the connection portion in the thick portion 36 and the leading end portion with the box portion 31 will be present on the side opposite to the side with the heat sink 60 using the resistance heating position of a heat source as a boundary. Thus, as in the first manufacturing method, as compared with the case in which the thick portion 36 itself is subjected to the resistance heating, the difference in the peak temperature of the leading end portion of the thick portion 36 and the connection portion becomes smaller and the difference in the time until the connection portion and the leading end portion reach the melting point of the solder 51 is significantly reduced. Accordingly, it is possible to make the wettability of the solder 51 excellent and to spread the solder 51 in a short time from the leading end of the thick portion 36 to the connection portion with the box portion 31. Thus, the worsening of the wettability of the solder 51 caused due to the temperature gradient between the heating and the heat dissipation is previously prevented.

Further, according to the present manufacturing method, a portion over a pair of ends provided in a widthwise direction of the lower region in the lower region BAR is subjected to the resistance heating. Thus, as compared with the laser heating in the first manufacturing method, as compared with the case in which a portion of the lower region BAR is subjected to the resistance heating, it is possible to avoid the heat to conduct in advance from going around from the pipe portion through the iron head to the heat dissipation portion. Therefore, the temperature gradient between the leading end portion and the connection portion in the thick portion 36 is still more suppressed.

(Third Manufacturing Method)

Figure 9:
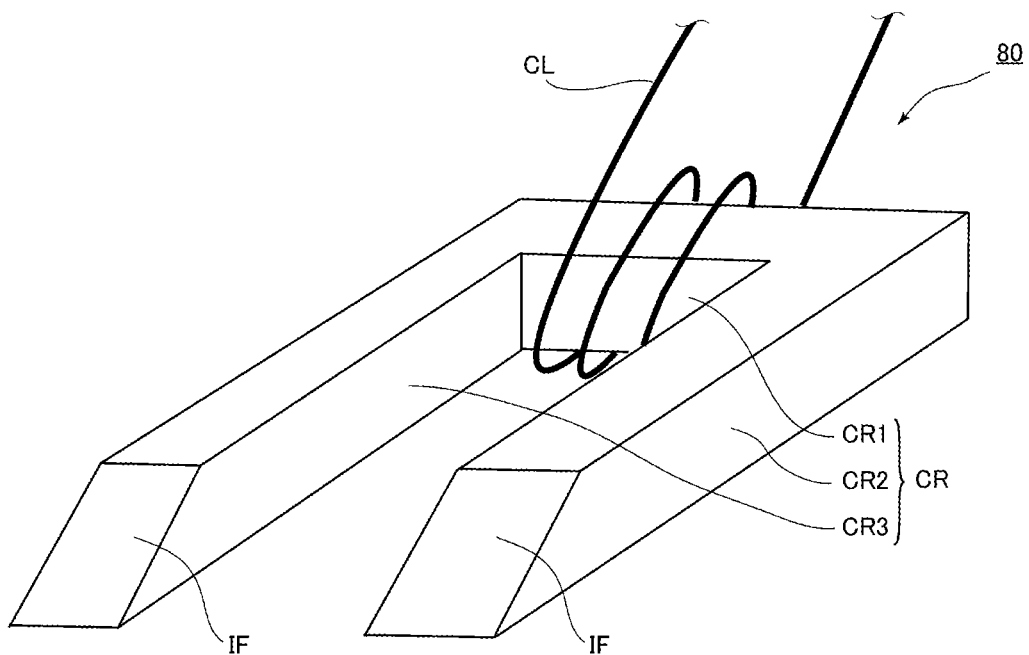
FIG. 9 is a diagram illustrating an induction heating tool.
Figure 10A:
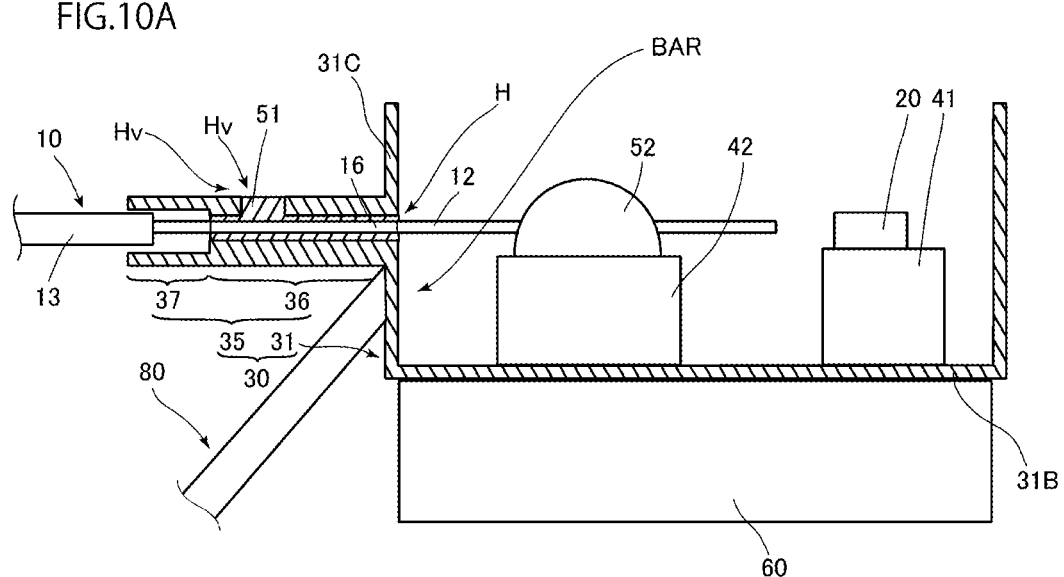
FIGS. 10A and 10B are diagrams illustrating a state of the soldering of the pipe portion by induction heating when viewed from the side and the longitudinal direction of the optical fiber.
Figure 10B:
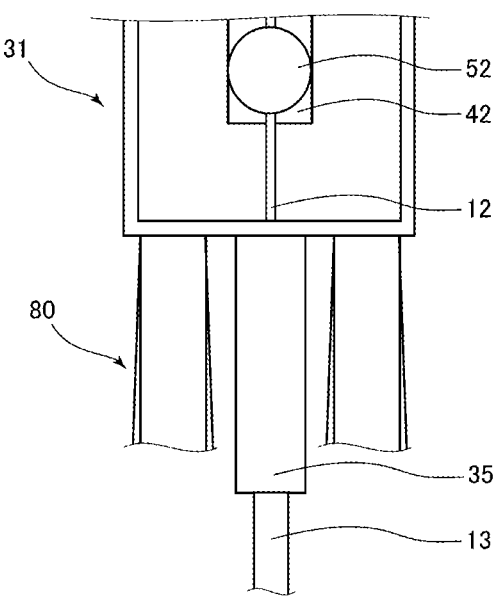

In a third manufacturing method, among the processes P1 to P5 of the above-described first manufacturing method, since only the soldering process P4 is different from that of the first manufacturing method, the soldering process P4 will be described with reference to FIG. 9 and FIGS. 10A and 10B. FIG. 9 is a perspective view illustrating an induction heating tool, and FIGS. 10A and 10B are diagrams illustrating a state of the soldering of the pipe portion by induction heating when viewed from the side and above.

The soldering process P4 in the third manufacturing method which is soldered by the induction heating is different from the soldering process P4 in the first manufacturing method which is soldered by the laser heating.

In the soldering process P4 of the third manufacturing method, as illustrated in FIG. 9, an induction heating tool 80 is used as the heating unit. The induction heating tool 80 includes a magnetic core CR and a coil CL as main components. The magnetic core CR is made up of a rod block CR1, a rod block CR2 which is connected to one end of the rod block CR1 and extends in a direction perpendicular to a longitudinal direction of the rod block CR1, and a rod block CR3 which is connected to the other end of the rod block CR1 and extends in parallel with the rod block CR2 and is formed in a U-shape as a whole.

These rod blocks CR1 to CR3 is made of magnetic materials such as a ferrite or dust core with high magnetic permeability, respectively and have, for example, a rectangular cross-section. A coil CL is wound on an outer peripheral surface of the rod block CR1. Further, as a winding target of the coil CL, the rod block CR2 or CR3 may be applied instead of rod block CR1 or in addition to rod block CR1. In short, the coil CL may be wound on the outer peripheral surface of at least a part of the rod blocks CR1 to CR3.

Widths of the rod block CR2 and the rod block CR3 is larger than an outer peripheral width (outer diameter) of the pipe portion 35. In addition, flat inclined surfaces IF are formed at open ends of the rod block CR2 and the rod block CR3 to be positioned obliquely from an end side to which the rod block CR1 is connected toward the open end side. Specifically, the magnetic core CR is cut from the end side to which the rod block CR1 is connected toward the open end side using a plane surface passing obliquely from one side to the other side as a cutting surface, and thus the plane surface becomes the inclined surface IF.

As illustrated in FIGS. 10A and 10B, the inclined surface IF is a surface which is abutted on the lower region BAR in the side wall 31C of the box portion 31 and specifically is abutted on an outer wall of the lower region BAR in a state where the optical fiber is inserted into the inner space of the magnetic core CR.

Thus, when an alternating-current signal is applied to the coil CL of the induction heating tool 80 in a state in which the inclined surface IF is abutted on the outer wall of the lower region BAR, magnetic field lines of the coil CL is converged to the magnetic core CR. Then, the heat is induced to the lower region BAR in the side wall 31C of the box portion 31 by the magnetic field lines generated in a gap of the magnetic core CR. The heat is conducted to the solder 51 through the side wall 31C of the box portion 31, and thus the solder 51 is melted. As a result, the solder 51 spreads to the thick portion 36.

As described above, according to the third method for manufacturing the optical module 1 in the present embodiment, the heat generated by the induction heating of the induction heating tool 80 is applied to the solder 51 from the side wall 31C to the thick portion 36 in the state in which the bottom wall 31B of the box portion 31 is heat-dissipated by the heat sink 60. Thus, as in the first manufacturing method, the temperature rise of the semiconductor laser element 20 itself caused due to the induction heating of the induction heating tool 80 is significantly reduced. Consequently, the deterioration of the characteristics of the semiconductor laser element 20 caused due to the induction heating of the induction heating tool 80 is suppressed.

In addition, the target of the induction heating is the lower region BAR in the side wall 31C of the box portion 31. In this case, as in the first manufacturing method, both of the connection portion and the leading end portion with the box portion 31 in the thick portion 36 will be present on the side opposite to the side with the heat sink 60 using the induction heating position of a heat source as a boundary. Thus, as in the first manufacturing method, as compared with the case where the thick portion 36 itself is subjected to the induction heating, the difference in the peak temperature of the leading end portion and the connection portion of the thick portion 36 becomes smaller and the difference in the time until the connection portion and the leading end portion reach the melting point of the solder 51 is significantly reduced. Accordingly, it is possible to make the wettability of the solder 51 excellent and to spread the solder 51 in a short time from the leading end the thick portion 36 to the connection portion with the box portion 31. Thus, the worsening of the wettability of the solder 51 caused due to the temperature gradient between the heating and the heat dissipation is previously prevented.

In the present embodiment, the induction heating tool 80 including the U-shape magnetic core CR and the coil CL wound on the outer peripheral surface of the magnetic core CR. When the magnetic core CR of the induction heating tool 80 is formed in the U-shape, the magnetic field lines generated from the open end of the magnetic core CR spreads to a more distant place as compared with a case in which, for example, the magnetic core CR is formed in the U-shape. Therefore, when the open end of the magnetic core CR is abutted on the lower region BAR of the side wall 31C, both of an inner wall and an outer wall of the lower region BAR can be subjected to the heating and the side wall 31C can be preferentially heated while heating the pipe portion 35. Therefore, the temperature gradient between the leading end portion and the connection portion in the thick portion 36 is still more suppressed as compared with the laser heating in the first manufacturing method and the resistance heating in the second manufacturing method.

In addition, since the open end of the magnetic core CR according to the present embodiment is formed as the flat inclined surface IF which is obliquely positioned from the opposite side of the open end toward the open end side, the inclined surface can be abutted on the outer wall of the lower region BAR in the state where the optical fiber is inserted into the inner space of the magnetic core CR.

Further, it is preferable that the magnetic permeability of the side wall 31C, to which at least the pipe portion 35 is connected, be higher than the magnetic permeability of the pipe portion 35. Specifically, for example, it can be realized by allowing materials of the pipe portion 35 and the side wall 31C to be different from each other in such a manner that the material of the pipe portion 35 is Kovar (registered trademark) (relative magnetic permeability 800) and the material of the side wall 31C is a soft iron (relative magnetic permeability 2000). In this way, since a magnetic flux is concentrated more and more on the side wall 31C than the pipe portion 35, an induction heating amount per unit space of the side wall 31C of the box portion 31 increases compared with the thick portion 36 of the pipe portion 35. Therefore, the temperature gradient between the leading end portion and the connection portion in the thick portion 36 is still more suppressed.

Above, the embodiment of the present invention is described as an example, but the present invention is not limited thereto.

In the second soldering process in the first manufacturing method, the radiation position of the laser beam L is one position, but may be a plurality of positions. Further, when the radiation positions are provided along the boundary between the side wall 31C, to which the pipe portion 35 is connected, and the pipe portion 35 at predetermined intervals in the lower region BAR, the side wall 31C is heated to surround a lower side of the boundary. For this reason, the heat to conduct going around from the pipe portion 35 to the heat sink 60, which is the heat dissipation portion, is avoided in advance, and the temperature gradient at the vicinity of the boundary between the pipe portion 35 and the side wall 31C is reliably suppressed. Similarly, even when the radiation positions are provided along the widthwise direction of the side wall 31C, to which the pipe portion 35 is connected, at predetermined intervals between the pair of ends provided in the widthwise direction of the lower region in the lower region BAR, it is possible to avoid the heat to conduct from going around from the pipe portion 35 to the heat sink 60.

In the second soldering process in the second manufacturing method, the portion over the pair of ends provided in a widthwise direction of the lower region in the lower region BAR is subjected to the resistance heating, but a portion surrounding the lower side of the boundary between the side wall 31C, to which the pipe portion 35 is connected, and the pipe portion 35 in the lower region BAR may be subjected to the resistance heating. In this way, as described above, the heat to conduct from going around from the pipe portion 35 to the heat sink 60 is avoided in advance, and the temperature gradient at the vicinity of the boundary between the pipe portion 35 and the side wall 31C is reliably suppressed.

The magnetic core CR of the induction heating tool 80 used in the third manufacturing method is formed in the U-shape, but may be formed in the U-shape. Moreover, other shapes may be applied. In addition, the cross-section of the magnetic core CR is also not limited to a rectangle, but various shapes such as a circle or ellipse may be applicable.

In the above embodiment, the hollow cuboidal shape is applied as the shape of the box portion 31, but a hollow column-shape may be applied. Moreover, various shapes other than these may be applied.

In the above embodiment, the circular shape is applied as the cross-section of the pipe portion 35, but the cross-section may be a rectangular shape. Moreover, cross-sectional shapes other than these may be applied. In addition, the thickness of the pipe portion 35 is different for each portion, but may be the same.

In the above embodiment, the optical module 1 using the semiconductor laser element 20 as an optical element is exemplified, but an optical module using other optical elements such as LiNbO$_3$ modulator for optical communication using, for example, a dielectric crystal is applicable without being limited thereto.

INDUSTRIAL APPLICABILITY

As described above, according to the present invention, a method for manufacturing an optical module which can manufacture optical modules with high reliability is provided, and it is possible to use in manufacturing a pumping light source, LiNbO$_3$ modulator for optical communication or the like.

REFERENCE SIGNS LIST

1 . . . optical module
10 . . . optical fiber
11 . . . core
12 . . . cladding
13 . . . coating layer
16 . . . metalized layer
20 . . . semiconductor laser element
30 . . . housing
31 . . . box portion
35 . . . pipe portion
36 . . . thick portion
37 . . . thin portion
41 . . . laser sub-mount
42 . . . fiber sub-mount
51 . . . solder
52 . . . coupling member
60 . . . heat sink
70 . . . soldering iron
80 . . . induction heating tool
BAR . . . lower region
CR . . . magnetic core
CL . . . coil
H . . . penetration hole
Hv . . . opening
IF . . . inclined surface
L . . . laser beam
P1 . . . preparation process
P2 . . . arrangement process
P3 . . . fiber coupling process
P4 . . . soldering process
P5 . . . filling process

The invention claimed is:

1. A method for manufacturing an optical module, comprising:
a preparation process of preparing an optical fiber, a cladding of one end of the optical fiber is exposed;
an arrangement process of arranging the optical fiber such that at least a leading end of a part on which the cladding is exposed is positioned in a box portion through a pipe portion in which one end of the pipe portion is connected to the box portion configured to accommodate an optical element and the pipe portion extends to an outside of the box portion; and
a soldering process of soldering an inner wall of the pipe portion and the optical fiber by heating firstly at least a part of a wall region of the box portion interposed between a heat dissipation portion and the pipe portion and transferring heat from thus heated wall region to the pipe portion in a state in which a part of the box portion, in which the optical element is accommodated, is heat-dissipated.

2. The method for manufacturing an optical module according to claim 1, wherein, in the soldering process, heating is performed over a pair of ends provided in a widthwise direction of a wall, to which the pipe portion is connected, in the wall region.

3. The method for manufacturing an optical module according to claim 1, wherein, in the soldering process, heating is performed along a boundary between a wall, to which the pipe portion is connected, and the pipe portion in the wall region.

4. The method for manufacturing an optical module according to claim 2, wherein, in the soldering process, induction heating is performed by magnetic field lines generated in a magnetic core on which a coil is wound.

5. The method for manufacturing an optical module according to claim 4, wherein the wall to which the pipe portion is connected has higher magnetic permeability than the pipe portion.

6. The method for manufacturing an optical module according to claim 3, wherein, in the soldering process, induction heating is performed by magnetic field lines generated in a magnetic core on which a coil is wound.

7. The method for manufacturing an optical module according to claim 1, wherein the soldering process heats directly the at least part of the wall region by contacting a heating equipment to the at least part of the wall region.

* * * * *